(12) United States Patent
Kosseifi et al.

(10) Patent No.: US 11,943,041 B2
(45) Date of Patent: *Mar. 26, 2024

(54) DYNAMIC SHIELDING SYSTEM OF CELLULAR SIGNALS FOR AN ANTENNA OF AN UNMANNED AERIAL VEHICLE

(71) Applicant: AT&T INTELLECTUAL PROPERTY I, L.P., Atlanta, GA (US)

(72) Inventors: Mario Kosseifi, Roswell, GA (US); Joseph Thomas, Marietta, GA (US); Giuseppe De Rosa, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/490,047

(22) Filed: Sep. 30, 2021

(65) Prior Publication Data
US 2022/0021442 A1    Jan. 20, 2022

Related U.S. Application Data

(63) Continuation of application No. 16/847,114, filed on Apr. 13, 2020, now Pat. No. 11,165,489, which is a
(Continued)

(51) Int. Cl.
*H04B 7/00* (2006.01)
*B64C 39/02* (2023.01)
(Continued)

(52) U.S. Cl.
CPC ....... *H04B 7/18506* (2013.01); *B64C 39/024* (2013.01); *H01Q 1/526* (2013.01);
(Continued)

(58) Field of Classification Search
CPC .. H04B 7/18506; B64C 39/024; H01Q 1/526; H01Q 1/28; H04W 4/026; H04W 48/20;
(Continued)

(56) References Cited

U.S. PATENT DOCUMENTS 8,798,922 B2    8/2014  Tillotson et al.
10,153,830 B2  12/2018  Kosseifi et al.
(Continued)

OTHER PUBLICATIONS

Tristancho et al. "An Electromagnetic Interference Reduction Check List for Unmanned Aircraft System", 48th AIAA Aerospace Sciences Meeting Including the New Horizons Forum and Aerospace Exposition, AIAA 2010-882, Jan. 4-7, 2010, 10 pages.
(Continued)

*Primary Examiner* — Khai M Nguyen
(74) *Attorney, Agent, or Firm* — Guntin & Gust, PLC; Matthew Tropper

(57) ABSTRACT

Dynamic shielding of cellular signals for an antenna of an unmanned aerial vehicle is disclosed. An example method may include receiving a navigation route for an unmanned aerial vehicle to execute during flight of the unmanned aerial vehicle and determining an orientation of a radio signal shield for an antenna of the unmanned aerial vehicle using ground level signal propagation information of radio signals for a network and the navigation route, wherein the radio signal shield prevents the radio signals from being received by the antenna from directions based on the orientation. The method may further include adjusting the radio signal shield using the orientation and communicating with a cellular base station of the network using the antenna.

20 Claims, 6 Drawing Sheets

Related U.S. Application Data continuation of application No. 16/215,525, filed on Dec. 10, 2018, now Pat. No. 10,623,086, which is a continuation of application No. 15/481,368, filed on Apr. 6, 2017, now Pat. No. 10,153,830.

(51) Int. Cl.

| | |
|---|---|
| *H01Q 1/52* | (2006.01) |
| *H04B 7/185* | (2006.01) |
| *H04W 4/02* | (2018.01) |
| *G01C 21/20* | (2006.01) |
| *H01Q 1/28* | (2006.01) |
| *H04W 48/20* | (2009.01) |
| *H04W 84/04* | (2009.01) |
| *H04W 84/06* | (2009.01) |
| *H04W 88/08* | (2009.01) |

(52) U.S. Cl.
CPC ......... *H04W 4/026* (2013.01); *B64U 2201/20* (2023.01); *G01C 21/20* (2013.01); *H01Q 1/28* (2013.01); *H04W 48/20* (2013.01); *H04W 84/042* (2013.01); *H04W 84/06* (2013.01); *H04W 88/08* (2013.01)

(58) Field of Classification Search
CPC ... H04W 84/042; H04W 84/06; H04W 88/08; B64U 2201/20; G01C 21/20
See application file for complete search history.

(56) References Cited

U.S. PATENT DOCUMENTS

| | | | |
|---|---|---|---|
| 10,623,086 B2 | 4/2020 | Kosseifi et al. | |
| 2014/0142787 A1* | 5/2014 | Tillotson | H04K 3/224 701/3 |
| 2015/0336670 A1 | 11/2015 | Zhang | |
| 2016/0088498 A1 | 3/2016 | Sharawi | |
| 2016/0130015 A1 | 5/2016 | Caubel et al. | |
| 2016/0144954 A1 | 5/2016 | Daigle | |
| 2016/0205560 A1* | 7/2016 | Hyslop | H04W 16/02 455/454 |
| 2016/0311531 A1 | 10/2016 | Rios | |
| 2018/0288731 A1* | 10/2018 | Akula | H04W 64/00 |

OTHER PUBLICATIONS

Non-Final Office Action received for U.S. Appl. No. 15/481,368 dated Mar. 1, 2018, 21 pages.

Non-Final Office Action received for U.S. Appl. No. 16/215,525 dated Aug. 6, 2019, 11 pages.

Non-Final Office Action received for U.S. Appl. No. 16/847,114 dated Jan. 29, 2021, 14 pages.

\* cited by examiner

DYNAMIC SHIELDING SYSTEM OF CELLULAR SIGNALS FOR AN ANTENNA OF AN UNMANNED AERIAL VEHICLE

RELATED APPLICATIONS

The present application is a continuation of U.S. patent application Ser. No. 16/847,114, filed Apr. 13, 2020, which is a continuation of U.S. patent application Ser. No. 16/215,525, filed Dec. 10, 2018, now U.S. Pat. No. 10,623,086, issued Apr. 14, 2020, which is a continuation of U.S. patent application Ser. No. 15/481,368, filed Apr. 6, 2017, now U.S. Pat. No. 10,153,830, issued Dec. 11, 2018, all of which applications are hereby incorporated by reference herein in their respective entireties.

TECHNICAL FIELD

This disclosure relates generally to wireless communication networks and drone device usage and, more particularly, to a dynamic shield system of cellular signals for an antenna of an unmanned aerial vehicle.

BACKGROUND

Unmanned aerial vehicles (UAVs), also referred to as unmanned aerial systems (UASs) or more commonly, drones, may be mobile platforms capable of detecting information, delivering goods, handling objects, and/or performing other actions. UAVs may provide many benefits over manned vehicles, including lower operating costs, fewer dangers of usage and/or travel, and increased accessibility to areas that may be dangerous for normal human travel. Moreover, UAVs may perform certain actions without the need for human assistance, for example, through preprogrammed instructions that may free operators to perform other tasks. Thus, UAVs may be preprogrammed to fly a flight path or route that may be navigated by the UAV using one or more flight controllers, as well as necessary sensors to execute the route. However, during operation of the UAVs, it may be beneficial or required to maintain intermittent or constant contact with the UAVs in order to determine whether the UAVs are properly executing their programmed tasks, adjust one or more programmed tasks of the UAVs (e.g., their flight path), and/or provide real-time control of the UAVs to one or more operators, such as a remote human or non-human operator that actively flies the UAVs. In order to provide contact with the UAVs, the UAVs may be equipped with one or more antennas that may maintain network connectivity, such as connectivity to a cellular network. As networks used for ground based user endpoints are generally optimized for those user endpoints operating at a ground level, altitude (e.g., how high the UAV is located) may affect and/or reduce performance of the antenna used to communicate with the UAV. For example, ground level geographic objects and factors may cause variations in signal propagation from base stations of the wireless network as compared to signal propagation at altitude.

Figure 1:
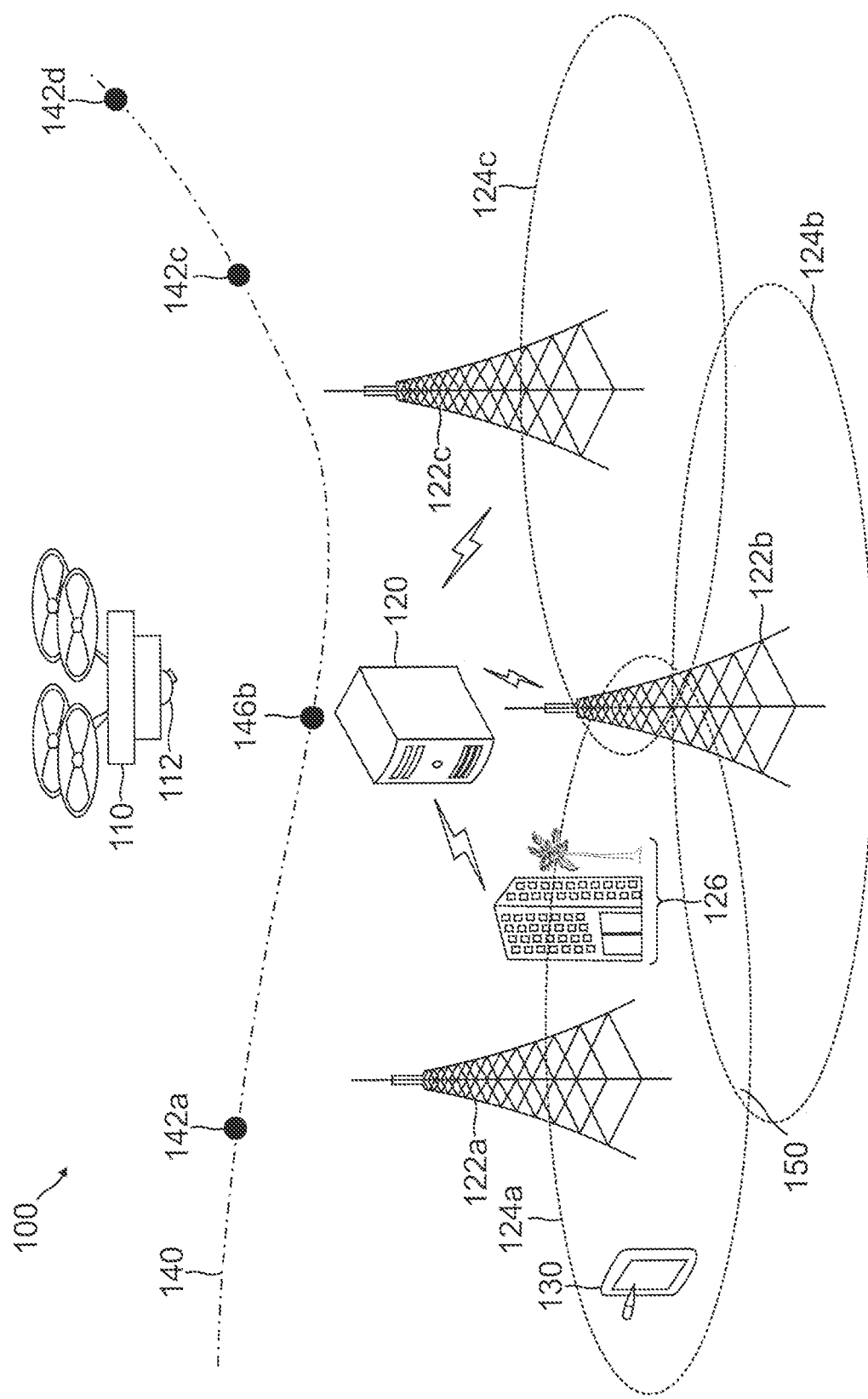
FIG. 1 illustrates an example of a network environment in which a system for testing and mapping of network connectivity by a UAV, according to an embodiment.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Using various embodiments, dynamic shielding of cellular signals for of an unmanned aerial vehicle (UAV) may be performed by utilizing an antenna and a specialized antenna shielding unit of a UAV that may selectively connect to access points of a cellular network during travel of the UAV along set flight paths. The antenna of the UAV may communicate with the access points through a cellular technology signal, such as those signals communicated by base stations (e.g., access points) of the cellular network and the antenna of the UAV. Traditionally, cellular networks are optimized for devices connecting at a ground level, such as two meters off the ground where typical cellular devices (e.g., mobile phones) may generally operate. In such cases, ground level objects (e.g., buildings and other manmade objects, trees and other natural obstacles, etc.) and geographic conditions (e.g., landforms including hills, mountains, etc. that may affect signal transmissions) may cause signal interference, reception problems, and issues in network coverage. In other embodiments, signal interference and/or loss may occur from other ground level occurrences, including loss due to bodies (e.g., people) and in-vehicle loss from transportation vehicles utilized by people during use of UEs. In order to compensate for ground level issues in network coverage, cellular base stations are optimized to transmit wireless network signals to account these ground level factors. However, UAVs travelling at altitude may instead encounter little to no ground level interference from ground level factors and/or may encounter different signal interferences on the cellular network, such as multiple base station signals interfering at altitude.

In order to provide network connectivity to an antenna of a UAV operating at altitude similar to user endpoints (UEs, which may include user devices, such as mobile phones, as well as UAVs) at ground level, the antenna of the UAV may be shielded using one or more radio frequency (RF) signal absorbing or reflecting materials that may be used to mimic RF signal reception at a ground level corresponding to the UAVs current position and altitude. For example, a UAV may be instructed to travel one or more flight paths at one or more altitudes, including preprogrammed routes and real-time instruction and operation of the UAV. The UAV may correspond to any device operated or to be operated at flight altitude. While operating the UAV on a flight path, a controller of the UAV may adjust and shield the antenna using the RF signal absorbing/reflecting material(s) or "shield(s)." This/these shield(s) may prevent RF signal reception by the antenna of the UAV from one or more incident directions. In this regard, the shield(s) may go up, down, or otherwise rotate or configure around the antenna to block incoming RF radiation from one or more selected directions by the controller. The controller may also add more or additional shields to a direction to provide additional shielding of RF signals incident from that direction.

In order to determine a placement or orientation of the shield(s) around the antenna, information necessary to imitate or mimic ground level interferences and network issues may be utilized. Additionally, as the UAV travels along a flight path, the current location of the UAV may be determined (e.g., at least a two-dimensional (2D) position of a latitude and longitude, however, certain embodiments may further use a three-dimensional (3D) position having latitude, longitude, and altitude). The 2D or 3D positions may be measured from a ground level or may be relative to the location and position of the base stations used to facilitate network connectivity and communication with the aerial-based devices at flight altitudes through a cellular technology signal. The location of the UAV may be used to extrapolate interference or loss of RF signals from base towers of the cellular network by determining interference cause by ground based objects at a ground level position matching or corresponding to the 2D or 3D position of the UAV (e.g., having the same or similar latitude and/or longitude). Once ground based interferences and losses are determined, placement or orientation of the shield(s) may be determined based on the ground based interferences/loss so that the shield(s) mimic or imitate such interferences/loss at altitude. This placement/orientation of the shield(s) may be determined using the information of the cellular network performance, a cellular network map of ground based performance, losses, and/or interferences, or other information that determines what RF signals should be received at particular positions based on the ground level interferences and/or losses of signals for the cellular network from the base stations of the cellular network.

In certain embodiments, the controller may select placement of the shields instead or additionally using detected RF signals, for example, where the antenna may detect RF signals from a specific direction or from a base station in a certain direction. In other embodiment, the arrangement and/or placement of the shield(s) may be predetermined based on the route of the UAV so that the present location of the UAV does not need to be determined and the shield(s) are adjusted/orientated according to time and/or the controller of the UAV may access the location-based shielding placements/orientations based on the location of the UAV without needing to determine the placements/orientations during flight on the path.

Once shielded, the antenna of the UAV may be used to communicate on the cellular network with a base tower using the cellular technology signal (e.g., 3G, 4G, 4G LTE, 5G, etc.) for the cellular network. The shield(s) of the antenna may further be adjusted during travel on the flight path, which may correspond to new locations. For example, once within range of another base station based on the ground level interference from ground level object, the shield(s) may be adjusted so that the antenna may connect with the new base station and shield the antenna from RF signals from the previously connected base station. In this way, the shields may imitate terrain clutter and signal loss occurring from ground In one or more embodiments, a device includes an antenna and a shielding unit for the antenna and comprising at least one radio signal shielding component that is movable around the antenna, wherein the at least one radio signal shielding component prevents reception of radio signals by the antenna from at least one direction associated with placement of the at least one radio signal around the antenna. The device further includes a non-transitory memory storing antenna shielding data for the at least one radio signal shielding component around the antenna during operation of an unmanned aerial vehicle, as well as one or more hardware processors configured to execute instructions to cause the device to perform operations comprising determining a location of the unmanned aerial vehicle during operation of the unmanned aerial vehicle and determining a first placement of the at least one radio signal shielding component using the antenna shielding data and the location. The operations also include instructing the at least one radio signal to shield the antenna according to the first placement and communicating, using the antenna, on a network during operation of the unmanned aerial vehicle based on shielding the antenna using the first placement.

In one or more embodiments, a method for a dynamically shielding cellular signals for an antenna of an unmanned aerial vehicle includes receiving a navigation route for an unmanned aerial vehicle to execute during flight of the unmanned aerial vehicle and determining an orientation of a radio signal shield for an antenna of the unmanned aerial vehicle using ground level signal propagation information of radio signals for a network and the navigation route, wherein the radio signal shield prevents the radio signals from being received by the antenna from directions based on the orientation. The method further includes adjusting the radio signal shield using the orientation and communicating with a cellular base station of the network using the antenna.

In one or more embodiments, a system comprises an unmanned aerial vehicle, an antenna mounted to the unmanned aerial vehicle, and a plurality of radio frequency shields that prevent radio frequency reception of the antenna from one or more directions based on one or more positions of the plurality of radio frequency shields, wherein the plurality of radio frequency shields are rotatable around the antenna. The system further includes a non-transitory memory storing geographic information for transmission of radio signals of a network at a ground level, wherein the geographic information comprises ground level objects affecting the radio signals of the network at the ground level, and one or more hardware processors configured to execute instructions to cause the device to perform operations comprising receiving a flight path of the unmanned aerial vehicle. The operations further include determining shielding positions of the plurality of radio frequency shields during flight of the unmanned aerial vehicle on the flight path using the geographic information, wherein the shielding positions are selected to simulate the ground level objects affecting radio signals of the network during flight of the unmanned aerial vehicle on the flight path. The operations then adjust the plurality of radio frequency shields according to the shielding positions during flight of the unmanned aerial vehicle on the flight path and communicate, using the antenna signal, on the network with one or more base stations during flight of the unmanned aerial vehicle on the flight path based on the shield positions.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Various techniques are provided for a dynamic shield system of cellular signals for an antenna of an unmanned aerial vehicle. One or more unmanned aerial vehicles (UAVs), also referred to herein as unmanned aerial systems (UASs) or drones, may operate at a flight altitude corresponding to one or more locations along a flight path or route within a three-dimensional (3D) space having a latitude, longitude, and altitude. These UAVs may travel at one or more altitudes according to a flight plan or route and communicate on a cellular network using the antenna. A location or travel route of the UAV may have a 3D position (or a 3D path/route within a 3D space) while travelling on the flight route, which may correspond to a ground level location or position, for example, through the same or similar latitude and/or longitude (e.g., two-dimensional (2D) coordinates). In other embodiments, the location or route of a UAV in 3D space (e.g., at altitude) may otherwise correspond to ground level positions, for example, through matching or creating similarities of the UAV at altitude to locations of ground level UE within coverage for a wireless network. The altitude coordinate may be a distance (e.g., height) from a reference sea level. In some cases, rather than the longitude, latitude, and/or altitude coordinates, other coordinate systems by which to define the position of the UAV relative to the access point/base station or other selected landmark.

The cellular network may be provided by a cellular network carrier or provider to facilitate communications between devices over the cellular network. Cellular network carriers generally design the wireless network to account for ground level disruptions in RF signal transmissions, ground level interference from terrain clutter and other geographic objects or considerations, and other types of losses caused at the ground level to ground level UEs. Base stations of a cellular network are generally those base stations utilized with user endpoints (UEs, which may include cellular devices as well as the UAVs discussed herein) at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause significant interference. Additionally, body and vehicle loss may be accounted for when designing and optimizing a wireless cellular network at ground level.

In some aspects, although the UAVs are not communicating with base stations dedicated to aerial communication, the UAVs may be configured to (e.g., programmed to) send and receive radio signals on the cellular network to accommodate (e.g., communicate with) the base stations without disrupting service to UEs at ground level. In an aspect, the base stations may accommodate cellular communication with the UAVs with minimal or no changes to structural features, such as the housing, antennas, and/or other components, such that the use of the base stations with the UEs at ground level are not affected by the accommodation of UAVs through providing a dynamic shield system of cellular signals for an antenna of a UAV. In this regard, the dynamic shield system may be utilized to mimic or imitate ground level interference, loss, or other RF signal issues and losses encountered by ground level UEs while the UAV travels at altitude in an environment that is not designed for network signal coverage and lacking a dominate base station or other RF signal transceiver, which has instead been optimized for ground level UEs.

When radio modules, such as 3G, 4G, 4G Long Term Evolution (LTE), 5G, other $3^{rd}$ Generation Partnership Project (3GPP)-based radio modules, and/or other radio modules, are placed at flight altitude, such as 400 feet or 500 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and command/control functions. In addition, higher altitudes generally have fewer obstructions than at ground level, and thus more signals may reach the devices/vehicles at higher altitudes and cause interference relative to devices/vehicles at ground level. The aerial devices/vehicles (e.g., UAVs) may include antennas to receive radio signals from one or more base stations, such as a closest base station and/or a base station associated with highest signal strength. The UAV may be equipped with cellular technology (e.g., using LTE or other cellular technology communication signal) antenna that receives RF signals on the cellular network. However, at altitude, the aforementioned issues become apparent to radio signals received by the antennas of the UAVs. In order to compensate for these issues, the UAVs may be equipped with one or more wireless signal shields and a shielding unit or component, which may dynamically adjust to mirror or imitate ground level interference and loss of UEs at a ground level associated with the current position of the UAVs.

The dynamic shielding unit may include one or more shielding components or materials, which may absorb and/or reflect wireless signals incoming from an incident direction (e.g., when interposed between the direction of the incoming wireless signal and an antenna of the UAV). Thus, when one or more of the shielding components or materials (or one or more shields) are placed between the antenna of the UAV and the incoming direction of a wireless signal, the shield(s) may prevent the antenna from detecting, absorbing and/or receiving the wireless signal, as well as transmitting wireless signals from the antenna to other receivers or transceivers in that direction. The shield(s) may completely absorb or reflect the signal, or partially absorb or reflect the signal. Thus, more than one shield may be required in certain aspects to provide a more complete signal shielding from a direction. The shield(s) may prevent radio frequency (RF) signals on the cellular network in the RF range used by the cellular network that are provided from base stations of the cellular network carrier within coverage areas of the RF signals from those base stations. In other embodiments, the shield may further or instead absorb or reflect wireless signals for other types of wireless networks, for example, to accommodate other types of wireless communication signals (e.g., satellite systems, short range wireless communication signals, etc.). However, in certain embodiments, the material used for the shields may be selected to only block RF signals on the cellular network to allow other types of wireless communications selectively used for the UAV (e.g., line of sight communications to control the UAV).

The shielding unit may therefore include one or more shields used to selectively block wireless signal from specific directions determined by the UAV or other control unit. In order to provide selecting blocking, the shield(s) of the shielding unit may be arranged, rotatable, or otherwise movable around an antenna of the UAV used to communicate on the cellular network. A controller and one or more physical movement components may be used to move, arrange, and place the shield(s) around the antenna as determined by the controller or other processing component of the UAV. The physical movement components may include mechanical attachments, motors, or other features to arrange the shield(s), as well as reposition the shields during flight of the UAV. The controller and/or a processor of the UAV may determine placement, arrangement, and/or repositioning of the shield(s) during flight, for example, based on input data necessary to determine placement of the shield(s) in order to have the shield(s) mimic or imitate ground based loss and interference while the UAV travels at altitude. Thus, the shield(s) may have the capability to rotate and move as necessary around the antenna using the shielding unit and one or more processors to determine correct shield placement during flight.

In order to determine correct shield placement of the shield(s) during flight, a location of the UAV may be required. As previously discussed, a position or location of the UAV may be determined, for example, a GPS coordinate of the UAV. Thus, the UAV may include a GPS component, which may interface with one or more remote GPS processors to determine a location of the UAV. Other types of location determining systems may also be used. Additionally, the location of the UAV may be determined through the flight route of the UAV, which may be plotted prior to travel on the flight path, and thus, the location of the UAV may be determined as a factor of time (e.g., where the UAV is on the flight path over time). The UAVs may be equipped with additional devices and sensors necessary for autonomous flying, which may also be used to determine a location of the UAV, for example, where the UAV diverges from a flight path. The location of the UAV may correspond to a 3D position (e.g. longitude, latitude, and altitude), which may be used to determine a similar ground level location, for example, in 2D space (e.g., the ground level longitude and/or latitude). The location of the UAV may therefore be matched or associated with a ground level location so that similar ground level losses that may occur for ground based UEs having the ground level location may be determined.

Using the location of the UAV, the controller or other processor for the UAV may determine similar ground level loss and/or interference experienced at ground level for ground level propagation of RF signals to ground level UEs when utilizing the cellular network at a ground level location similar to the location of the UAV. For example, at altitude, the UAV may not experience loss due to geographic clutter, terrain, and other ground level issues. However, the UAV may experience other coverage and interference issues due to interfering base stations (e.g., where a dominate RF base station does not exist due to the lack of ground level loss), the obstacle information around the UAV, weather information around the UAV and/or generally any other static and dynamic information associated with flight of the UAV. Thus, the antenna of the UAV may be shielded in specific directions to mimic or imitate the ground level losses experienced by ground level propagation of RF signals from one or more base stations of the cellular network to UEs having a similar location to the current location of the UAV when travelling at altitude. The information on ground level interference and loss and may be used to determine which RF signal base station may be used by a ground level device at a ground level location similar to the at altitude location of the UAV. Thus, information of cellular network coverage, terrain and geographic objects and considerations, base station RF signal propagation, and/or other information or mapping that determines what loss/interference ground level UEs experience at various positions may be used with the position of the UAV. Such information may be determined by the cellular network carrier or a third party determining and/or mapping cellular network coverage, base station usage, and/or RF signal propagation. Thus, the controller and/or processor of the UAV may select shield placements based on the location and this information in order to mirror the ground level interference and/or loss. The shielding of the antenna may also be affected by the altitude, for example, by requiring additional shielding for higher altitudes having more competing RF base stations and/or loss obstruction by geographic conditions.

In other embodiments, the ground level location matching or associated with the flight location of the UAV may not be required, and instead the flight location of the UAV may be used to determine shield placement or orientation through a 3D map of signal coverage of the cellular network and at altitude (e.g., altitude based) interferences or other information. For example, a map of cellular coverage may include interferences in cellular network signaling, network connectivity issues in the cellular network signals, messaging errors on the cellular network, and/or other signal diagnostics for cellular network signals on the cellular network. The map may include 3D positions of such network issues, and may be used by the controller or processor to determine shield placement based on the network coverage issues.

Once the ground level interference and/or loss is determined for the current location of the UAV, the shield controller and/or processor of the UAV may determine the shield placement. As discussed herein, a shield placement may correspond to shielding of the antenna using the one or more shields in order to mimic or imitate ground level interference and loss experienced by ground level UEs at a similar location to the UAV. Thus, the shield placement or orientation may be used to selectively shield the antenna of the UAV in order to receive RF signals for a selected direction and avoid interference of RF signals on the cellular network caused by operating the UAV at one or more altitudes. In this regard, the shield placement may be used to select RF signals for a specific base station, thereby creating a dominate RF server for communication with the UAV. In certain embodiments, the UAV may not determine shield placement or orientation using the location of the UAV and the necessary information on ground level loss and/or geographic conditions, and instead a remote processing entity, such as the cellular network carrier, may determine the shield placement and preload the shield placement or feed the shield placement in real-time to the UAV.

Once the position of the shield(s) is determined, the shield(s) may be moved, rotated, or otherwise arranged around the antenna based on the positioning of the shield(s) to mimic the ground level loss experienced at ground level for RF signals on the cellular network. The shield(s) may therefore be used to select specific RF signals to be blocked and other signaling to be received by the antenna of the UAV. During flight, as the location of the UAV changes, the ground level loss/interference for the changing positions may be determined, and the shield(s) may be adjusted and repositioned as necessary.

Once the shields are positioned, the UAV may utilize the antenna to communicate on the cellular network through communicating with one or more base stations of the cellular network carrier. The network may include a wide area network (WAN), such as a cellular-based WAN. In the case of a cellular network, the cellular network information may be provided for the cellular-based WAN. In an aspect, communications on the cellular network may be provided as part a broadcast message to and from the UAV. For example, the information may be communicated in a master information block (MIB) message, system information block (SIB) message, Multimedia Broadcast Multicast Services (MBMS)-based message, Evolved MBMS (eMBMS)-based message, and/or generally any message that can be transmitted (e.g., broadcasted) to and from the base stations of the cellular network and UAVs within receiving range of radio signals from the base stations.

Although the description of the present disclosure is made with respect to UAVs and cellular networks, the techniques described herein may be applied to any wireless network and any devices/vehicles capable of establishing connectivity in such wireless networks. By way of non-limiting example, the devices/vehicles may include, or may be included in, devices or vehicles at or near ground level (e.g., mobile devices, cars), naval-based devices (e.g., watercraft), and devices at higher altitudes (e.g., UAVs, any device at higher altitudes). In this regard, the techniques described herein may be utilized for devices located at higher altitudes, including as mobile phones and/or other devices/vehicles operated at higher floors of a building.

FIG. 1 illustrates an example network environment 100 in which a dynamic shield system of cellular signals for an antenna of an unmanned aerial vehicle may be implemented in accordance with one or more embodiments. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a UAV 110, a cellular network carrier 120, base stations 122a-c, and a user device 130. UAV 110, cellular network carrier 120, base stations 122a-c, and user device 130 may be in communication directly or indirectly with each other. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

UAV 110 may include, may be a component of, and/or may be referred to as, a user endpoint or UE. UAV 110 may include a flight control unit, communication unit, and payload unit. The flight control unit or other operation module of UAV 110 that may be configured to facilitate navigation of UAV 110, e.g., take off, landing, and flight of UAV 110. Such an operation module may include any appropriate avionics, control actuators, and/or other equipment, along with associated logic, circuitry, interfaces, memory, and/or code. Additionally, the flight control unit or other operation module may include a controller that receives flight route information from one or more sources, including a memory and/or external controller (e.g., set instructions from a service provider and/or inflight navigation/instructions from an operator) that operates UAV 110. The flight control unit may further include one or more components to determine a location or position of UAV 110, including a 3D position (e.g., longitude, latitude, and altitude) of UAV 110 when operating along a flight path. The location determination component may correspond to a global positioning system (GPS) component, or other component used to determine a location of UAV 110. The GPS component provides a current position of UAV 110 (e.g., using three coordinates). The position information from the GPS, together with position information of devices in communication with UAV 110, may allow UAV 110 to execute a flight route as well as provide positioning information associated with determination of antenna shielding, as discussed herein. Thus, the components of the flight control unit may facilitate implementation of various features supported by UAV 110.

The communication unit may include one or more radio transceivers (e.g., that include antennas) along with associated logic, circuitry, interfaces, memory, and/or code that enable communications, e.g. with one or more of base stations 122a-c, and/or directly with cellular network carrier 120, via wireless interfaces and using the radio transceivers. In FIG. 1, the radio transceivers of UAV 110 may be included in an antenna housing 112, which may be omni-directional or directional. Antenna housing 112 may be utilized to radiate and/or receive power uniformly in all directions, or one or more desired directions to allow increased performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced through the use of a directional antenna. Antenna housing 112 may be contained within a housing of UAV 110 (e.g., embedded within the housing and/or circuitry of UAV 110), or disposed (e.g., mounted) outside a housing of UAV 110 as an attachable and/or removable module. Antenna housing 112 may further include one or more antenna shields for the antenna/radio transceivers in antenna housing 112, which may be used to directionally block radio signals on a cellular network from one or more of base stations 112*a-c*, thereby further directionally receiving radio signals from other sources (e.g., base stations 112*a-c*). In some cases, the shields and/or antenna of antenna housing 112 may be movable along and/or rotatable about one, two, or three axes. In other cases, the shields and/or antenna of antenna housing 112 may be fixed (e.g., not movable and not rotatable). Antenna housing 112 may include an antenna using a cellular technology (e.g., using LTE or other cellular technology communication signal).

One or more radio transceivers of antenna housing 112 may be used to communication on a cellular network using cellular tower signals from base stations 122*a-c*. In this the shield(s) of antenna housing 112 may be used to mimic ground based loss and interference of ground based RF signal propagation from base stations 122*a-c*. The shield(s) may include one or more components having RF absorption and/or reflection capabilities, such as material that may reflect or absorb RF signals from base stations 122*a-c* when interposed between RF signals from base stations 122*a-c* to the antenna of antenna housing 112. Antenna housing 112 may have a number of shields based on an altitude that UAV 110 may travel at while on a flight path or route, for example, where additional shields may be required at higher altitudes due to increased interference of RF signals from base stations 122*a-c* due to lack of ground based terrain and clutter. Additional shields may therefore provide additional absorption and/or reflection/rejection of RF signals from reaching the antenna within antenna housing 112. Placement of the shields may be selected based on a controller of antenna housing 112 and/or a processor of UAV 110, which may utilize location information from the flight control unit and information of ground based loss/interference for signal propagation of RF signals from base stations 122*a-c*. In various embodiments, placement of the shield(s) may be chosen so that the shields may cover an opposite direction from the direction of travel of UAV 110, thereby eliminating interference of RF signals from a base station that UAV 110 is travelling away from. However, other placements may also be used, for example, based on signal strength and/or when approaching one of base stations 122*a-c* that UAV 110 would like to communicate with during approach and flight. The signal strength may be, or may be based on, measurements such as received signal strength indicator (RSSI), reference signal received power (RSRP), reference signal received quality (RSRQ), signal-to-noise ratio (SNR), signal-to-interference-plus-noise ratio (SINR), and/or other measurements. Such measurements of signal strength may be detected and/or computed by UAV 110. In an aspect, signal strength may be referred to as signal quality, signal level, or signal power. Higher signal strength is generally associated with better reception.

Thus, an antenna of antenna housing 112 may be used to message with one or more of base stations 122*a-c*. In various embodiments, the communication unit of UAV 110 may further include suitable logic, circuitry, interfaces, memory, and/or code that enable wired communications, e.g. with one or more of base stations 122*a-c*, and/or cellular network carrier 120 directly. In this regard, UAV 110 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, UAV 110 may utilize wired connections when at or near ground level, such as a wired connection between UAV 110 and one or more ground level devices or cellular network carrier 120 for facilitating testing and/or calibration/setup of UAV 110. In other embodiments, the communication unit may send and/or receive information, including flight paths and cellular network information, over a cellular technology signal/network (e.g., 3G, 4G, 5G, and/or other 3GPP-based cellular network) to one or more of base stations 122*a-c*. Thus, UAV 110 may wirelessly communicate with other devices using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, UAV 110 may be configured to communicate with another device using a proprietary wireless communication protocol and interface.

The payload unit may be configured to implement features supported by UAV 110 and facilitate implementation of such features. The payload unit may include any equipment and associated logic, circuitry, interfaces, memory, and/or code. Depending on an application(s) of UAV 110, the payload unit may include one or more onboard sensors, which may be contained within a housing of UAV 110 or mounted outside the housing of UAV 110. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Such sensors may be utilized to prevent collisions, and may include other necessary processing features for a collision avoidance system. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of UAV 110. Payload unit may also contain necessary rechargeable power sources, including a rechargeable solar battery and associated solar charging panel or photovoltaic charging source.

User device 130 may be, and/or may include, a mobile phone, a personal digital assistant (PDA), a tablet device, a computer, or generally any device that is operable to communicate wirelessly (e.g., via cellular standards using antennas) with UAV 110, cellular network carrier 120, and/or one or more of base stations 122*a-c*. In an aspect, user device 130 may be a device at ground level that utilizes the wireless network provided by cellular network carrier 120. In this regard, user device 130 may receive radio signals from one or more of base stations 122*a-c*, which may be configured to provide the wireless network to user device 130 based on ground objects 126. Thus, the wireless network provided by one or more of base stations 122a-c may be specifically calibrated and/or configured for communication with user device 130 based on ground objects 126.

In some cases, UAV 110 and/or user device 130 may be configured to interface with a wired network, such as via an Ethernet interface, power-line modem, DSL modem, PSTN modem, cable modem, and/or other appropriate components for wired communication. Alternatively or in addition, UAV 110 and/or user device 130 may support proprietary wired communication protocols and interfaces. UAV 110 and user device 130 may be configured to communicate over a wired link (e.g., through a network router, switch, hub, or other network device) for purposes of wired communication, e.g. such as during testing, setup, and/or calibration stages of UAV 110 and/or during use of user device 130. UAV 110 may be at or near ground level to receive a wired connection. Although a single UAV and user device (e.g., UAV 110 and user device 130) is shown in FIG. 1, multiple UAVs and user devices (e.g., multiple UAVs and/or user devices) may be utilized and function similarly.

One or more of base stations 122a-c may include, may be a component of, and/or may be referred to as, a cell, a Node B (NB), an Evolved Node B (eNodeB or eNB), or a Home eNB (HeNB). One or more of base stations 122a-c include suitable logic, circuitry, interfaces, memory, and/or code that enable communications, e.g. with user device 130, one of the other base stations 122a-c, and/or cellular network carrier 120, via wireless interfaces and utilizing one or more radio transceivers (e.g., RF signal antennas). In an aspect, base stations 122a-c may transmit (e.g., broadcast) messages that, if received by UAV 110, facilitate directing and/or placement of one or more shields within antenna housing 112 of UAV 110 in order to provide shielding of one or more antennas of UAV 110, as well as navigation of UAV 110. In some cases, the messages transmitted by base stations 122a-c may be based on information base stations 122a-c receive from cellular network carrier 120. In some cases, one or more of base stations 122a-c may be mobile (e.g., mobile base stations at ground level, mobile base stations at flight altitudes, mobile naval-based base stations, etc.), in which case its position information is dynamic.

Base stations 122a-c may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, base stations 122a, 122b, and 122c have nominal coverage area 124a, 124b, and 124c, respectively, at ground level or near ground level. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by base stations 122a-c may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. Due to the change in coverage area at altitude, UAV 110 may encounter interference and other signal issues during flight at altitude due to the lack of ground based loss, thereby not having a dominant RF signaling station from base stations 122a-c to utilize. As used herein, the coverage area and coverage volume may be referred to more generally as a coverage region, where the region may be two-dimensional (e.g., coverage area) or three-dimensional (e.g., coverage volume).

Cellular network carrier 120 may be, may include, and/or may be a component of, a core network for processing information from UAVs (e.g., UAV 110), user devices (e.g., user device 130), and/or base stations (e.g., base stations 122a-c) and managing connections of the UAVs and/or user devices to the base stations. For example, cellular network carrier 120 may be, may include, and/or may be in communication with, a mobile telephone switching office (MTSO). Cellular network carrier 120 and base stations 122a-c may be provided by a cellular network carrier or provider. Cellular network carrier 120 includes suitable logic, circuitry, interfaces, memory, and/or code that enable communications, e.g. with one or more of base stations 122a-c and/or one or more UEs (e.g., UAV 110 and user device 130), via wireless interfaces and utilize one or more radio transceivers. In this regard, cellular network carrier 120 may be dedicated to facilitate connectivity of UAVs (or other vehicles/devices at flight altitude) with base stations 122a-c (and/or other base stations), or may be utilized to facilitate connectivity of UAVs and ground-based devices with base stations 122a-c (and/or other base stations).

In an aspect, cellular network carrier 120 may be, may include, or may be a part of, a server (e.g., a centralized server) that can generate and distribute information to base stations 122a-c, as well as receive information from base stations 122a-c. Base stations 122a-c may then relay the information from cellular network carrier 120 to UAV 110 and/or user device 130. In some cases, when UAV 110 is in range of cellular network carrier 120, cellular network carrier 120 may transmit information directly to UAV 110 (e.g., through a wired or wireless signal). In an aspect, cellular network carrier 120 may provide each of base stations 122a-c with respective flight and/or travel route/path information (e.g., position, altitude, route, obstacle, weather, and other necessary information to navigate UAV 110) to be transmitted (e.g., broadcasted) to UAV 110. In other embodiments, cellular network carrier 120 may directly provide the information to UAV 110. Cellular network carrier 120 may also provide UAV 110 with information necessary to determine positioning and/or orientation of shields of antenna housing 112

Base stations 122a-c may be in communication with cellular network carrier 120 through a backhaul network. Cellular network carrier 120 may be in direct communication with one or more of base stations 122a-c or in communication with one or more of base stations 122a-c through one or more intermediary base stations. For example, in FIG. 1, cellular network carrier 120 is in direct communication with base stations 122a-c. In other cases, a base station may be in communication with cellular network carrier 120 via one or more intervening base stations. In an embodiment, cellular network carrier 120 may determine and/or have access to signal strength statistics at different positions (e.g., altitudes) and/or different frequency bands, e.g. based on the measurement reports generated by the UEs, including UAV 110 and/or user device 130. In some cases, cellular network carrier 120 may determine preferred frequency bands to be utilized at various altitudes based on the signal strength statistics. Additionally, cellular network carrier 120 may determine ground level interference and loss due to geographic conditions, terrain, and additional clutter (e.g., human made objects, persons, vehicles, etc.), which may be mapped or otherwise associated with ground level locations. The information may be used to determine a dominant or selected base station at a ground level location, as well as other RF signal propagation at ground level. In information may also be used to select positioning and orientation of the shields of antenna housing 112 during flight of UAV 110 to mimic the ground level loss.

The flight path 140 may be a portion of a flight path along which UAV 110 is moving or intends to move in going from a starting point to a destination point. The flight path 140 may be defined by a set of positions, including positions 142a-d shown in FIG. 1, at which UAV 110 is located, has been located, or is expected to be located. The positions 142a-d may each be associated with a set of three-dimensional coordinates (e.g., longitude, latitude, altitude). For example, during a flight route, the starting point may be a warehouse or takeoff point at which UAV 110 is provided with the travel route for execution.

At the position 142a, UAV 110 may be within coverage area 124a for base station 122a. Different base stations may provide better signal strength at the different positions 142a-d along flight path 140. For example, among base stations 122a-c, the base station 122a may be generally associated with the highest signal strength at the position 142a, whereas the base station 122b may have higher signal strength of position 142b and base station 122c may be generally associated with higher signal strength at the positions 142c and 142d.

As shown in FIG. 1, the coverage areas 124a-c of base stations 122a-c may overlap. The coverage areas 124a-c may represent the coverage areas of base stations 122a-c at ground level. UAV 110 may be within range of two or more of base stations 122a-c, thereby causing interference or other signal issues and/or degradation. For example, UAV 110 may be within range of the base stations 122a and 122b in an overlap region 150. Based on a specific position of UAV 110, signal strength between UAV 110 and the base station 122a may be different from (e.g., stronger than, weaker than) signal strength between UAV 110 and the base station 122b. In some cases, the overlap in the coverage regions may be more pronounced at flight altitudes than at ground level, such as due to fewer obstructions. Thus, overlap region 150 may correspond to interference areas or potential issues in coverage at altitude of base stations 122a and 122b when providing coverage areas 124a and 124b.

During flight path 140, UAV 110 may therefore enter into RF signal range of base stations 122a-c having coverage areas 124a-c. In an aspect, the flight path 140 may be a preprogrammed flight path, e.g. preloaded by cellular network carrier 120 to UAV. For example, UAV 110 may communicate (e.g., directly or indirectly) with cellular network carrier 120 and provide a starting point (e.g., a current position of UAV 110) and a destination point. In response, cellular network carrier 120 may generate and provide to UAV 110 one or more potential flight paths. An operator of UAV 110 and/or user device 130 may select and/or confirm the flight path to be utilized. In further embodiments, during flight of UAV 110, UAV 110 may autonomously make adjustments to the flight path 140, or may be instructed of the flight path and/or adjustments to the flight path. The adjustments may be based on onboard sensors (e.g., for sensing obstacles, weather, etc.) and/or based on information received from one or more of base stations 122a-c (e.g., obstacle, weather, traffic emergency information). In an aspect, UAV 110 may be operated to maintain a minimum distance separation between UAV 110 and other UAVs, and/or between UAV 110 and obstacles, e.g. such as minimum distance separation requirements or recommendations from the Federal Aviation Administration (FAA). In some cases, a flight path of UAV 110 may have a fixed altitude level (e.g., UAV 110 has to fly somewhere between a fixed minimum altitude level and a fixed maximum altitude level) and/or an operating frequency of UAV 110 may be within a fixed frequency band (e.g., fixed frequency range). Such parameters on the flight path of UAV 110 may be set by cellular network carrier 120 and/or flight regulations.

Thus, the flight path and/or connectivity between UAV 110 and the cellular network via base stations 122a-c (and/or other base stations) may be further facilitated through additional information such as obstacle, weather, traffic management information (e.g., air traffic management information), emergency broadcast information, and/or generally any other information that may be static or dynamic in the airspace that can be communicated to facilitate communication of UAV 110 with use of the cellular network. The obstacle information and weather information may identify obstacles (e.g., trees, buildings) and weather (e.g., rain, fog, hail) within coverage regions of the base stations 122a-122c, or portion thereof. For example, the base station 122a may provide position information (e.g., latitude, longitude, height) encompassed by the obstacles. The traffic management information may provide information indicative of signal strengths at different frequency bands and/or at different positions (e.g., altitudes, longitudes, and/or latitudes). In some cases, the traffic management information may provide preferred frequency bands at different altitudes. The emergency broadcast information may identify traffic incidences and/or no-fly zones (e.g., temporary no-fly zones due to these traffic incidences). Such information may allow UAV 110 to select the base station to connect with during flight, adjust a frequency band utilized for communication, and/or adjust a flight path (e.g., an altitude of various points along the flight path).

During or after execution of flight path 140 by UAV 110, antenna housing 112 may adjust one or more internal shields to shield an internal antenna of antenna housing 112 used by UAV 110 to communicate on the wireless network provided by base stations 122a-c. Location information of UAV 110 during flight may be used with the information on ground based loss and interference of RF signals from base stations 122a-c in coverage areas 124a-c to determine placement of the internal shields, as discussed herein. For example, the internal shield(s) may be placed or oriented to mimic ground level loss/interference and select one of base stations 122a-c for communication with on the cellular network by blocking RF signals from the other ones of base stations 122a-c. The location information may include a longitude, latitude, and altitude of UAV 110, and/or information indicative of the longitude, latitude, and altitude (e.g., information from which cellular network carrier 120 may derive the longitude, latitude, and altitude). In some cases, rather than the longitude, latitude, and/or altitude coordinates, other coordinate systems by which to define the position of base stations 122a-c may be utilized.

As previously discussed, cellular network carrier 120 and/or another third party entity providing network coverage diagnostics and analysis may determine the information of RF signal propagation, ground level loss/interference, and/or other information of RF signal transmission and reception of RF signals from base stations 122a-c having coverage areas 124a-c and ground level UEs, such as user device 110. The information may further include altitude based interferences of coverage areas 124a-c in a 3D space, which may display propagation of signals from base stations 122a-c having coverage areas 124a-c. Thus, the information may be used to select a base station for transmission of signals at specific locations in 3D (e.g., for a specific latitude, longitude, and altitude). In certain embodiments, selection of the antenna shielding placement/orientation may be based on measurements of relative signal strengths of signals from different base stations and interferences of similar signaling. The base station that is selected may differ at different altitudes and/or at different frequency bands used for communication. To facilitate connectivity between base stations 122a-c and UAVs (e.g., UAV 110) during flight of the UAVs, information for ground level interference/loss may be used for base stations 122a-c.

Using this information with the location information, antenna housing 112 may configure one or more internal shields to mimic ground level loss/interference, and connect with one or more of base stations 122a-c in coverage areas 124a-c during a flight route. UAV 110 may maintain a wireless communication link between UAV 110 and one of base stations 122a-c in order to send and/or receive information at an acceptable signal strength during at least a portion of a flight path of UAV 110 through the shielding provided by antenna housing 112. Received information by UAV 110 may correspond to a flight path or route information, and/or any changes or deviations to the selected route. In certain embodiments, the antenna of antenna housing 112 may also receive information for arrangement and/or orientation of the shields over the wireless communication link. Thus, antenna shielding arrangement and orientation may be selected and rearranged during flight path 140 based on the location information and the information of ground based loss. The shields of antenna housing 112 may therefore be used to receive RF signals from another base station when the signal strength and/or signal strength statistics associated with signals from the selected one of base stations 122a-c falls below a threshold value or otherwise would be different at a ground level location associated with UAV 110's present location.

In an embodiment, UAV 110 may receive information (e.g., geographic clutter and/or information) from non-network devices (also referred to as non-network nodes). In this regard, base stations 122a-c and cellular network carrier 120 may be referred to as network devices or network nodes of the cellular network. In some cases, a non-network device may provide one-way communication from the non-network device to UAV 110. A non-network device may be placed at locations at or near an obstacle for example, and broadcast (e.g., using its antenna(s)) its position information and/or other geographic information to help prevent collision of UAV 110 and/or other UEs/UAVs with the obstacle. As an example, the non-network device may be placed at or near a tall tree. As another example, the non-network device may be placed at a location designated as a no-fly zone and utilized as a no-fly zone beacon. For instance, a traffic accident (e.g., whether between two cars at ground level, two UAVs, a car and a building, and so forth) may cause emergency helicopters and/or other aircrafts to deployed in and/or around the no-fly zone. UAV 110 may impede emergency response if flown in or around the no-fly zone.

Although FIG. 1 is described with respect to UAV 110, the UE may generally be any device, e.g. at ground level or at higher altitudes, that can collect cellular network information using an antenna housing 112. Although UAV 110 is depicted as including a single antenna, in some cases UAV 110 may have more and/or different antennas than those shown in FIG. 1. For example, in an aspect, UAV 110 does not include an omnidirectional antenna, and/or UAV 110 includes multiple directional antennas. In addition, FIG. 1 illustrates one example of a network configuration. Other network configurations may be utilized to allow communication between UAV 110, cellular network carrier 120, base stations 122a-c, and user device 130. The network environment 100 may include a different number of UAVs, user devices, base stations, and/or network management systems than that shown in FIG. 1.

Figure 2:
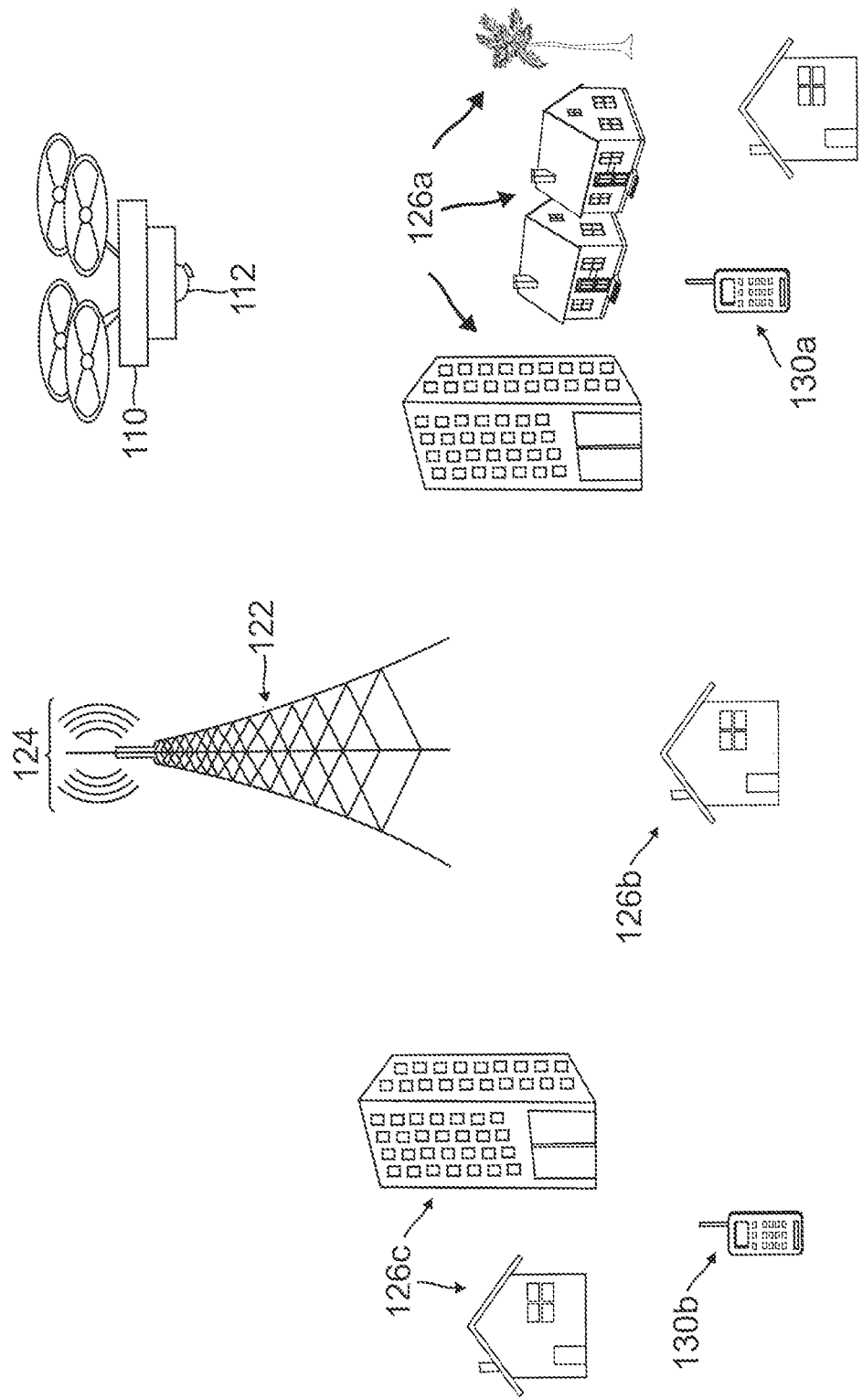
FIG. 2 illustrates an example of base station transmitting a cellular network signal that is affected by ground level objects causing interference and loss, according to an embodiment.

FIG. 2 illustrates an example of base station transmitting a cellular network signal that is affected by ground level objects causing interference and loss, according to an embodiment. Environment 200 of FIG. 2 includes UAV 110 having antenna housing 112 discussed in reference to network environment 100 of FIG. 1. Additionally, a base tower 122 having coverage area 124 corresponds generally to one of base stations 122a-c having coverage areas 124a-c, respectively, in network environment 100 of FIG. 1. Moreover, ground objects 126a-c, and user devices 130a-b corresponds generally to ground objects 126 and user device 130, respectively, in network environment 100 of FIG. 1.

In various embodiments, environment 200 of FIG. 2 demonstrates signal differences between UEs located at ground level (e.g., user devices 130a-b) and UEs at altitude (e.g., UAV 110). As shown in FIG. 2, environment 200 includes base station 122 broadcasting RF signals within coverage area 124 for communication with UEs. The radio signals may correspond to a cellular network, or other network used for wireless communications. In general, base station 122 is optimized for transmission of radio signals in coverage area 124 at a ground level, such as two meters or similar off the ground where many ground based wireless devices operate (e.g., user devices 130a-b). Thus, base station 122 and coverage area 124 are optimized to take into account ground objects 126a-c, such as office buildings, homes, and/or trees. Other geographic conditions, terrain, and/or ground based objects may be considered, includes human bodies, vehicles, geographic affects, and the like. Additional human made or nature geographical objects and conditions may similarly affect radio signals from base station 122 in coverage area 124. Ground objects 126a-c may therefore cause signal interference and/or loss due to additional unwanted signal, interruption, RF signal absorption or reflection, or other causes of signal interference or loss. Thus, base station 122 may be configured to transmit within coverage area 124 based on such interference/loss and be the dominant RF signal carrier for coverage area 124. Users utilizing user device 130a-b may receive optimized radio signal coverage area 124 for the wireless network from base station 122 based on such considerations by a cellular network operator or carrier at a ground level. A similar nearby base station may further transmit within a coverage area based on ground based geographic terrain and clutter, where such a base station is the dominant RF signal carrier for the region when user devices 130a-b are within that region.

However, UAV 110 may be flying at an altitude where ground objects 126a-c do not impede radio signal transmissions from base station 122 within coverage area 124. Instead, other interference may occur at altitude, for example, from another base station having an overlapping signal coverage area at altitude due to the lack of ground based geographic conditions impeding signal propagation and causing ground level interference or loss. At the altitude, other factors may influence signal transmissions, interferences, and/or messaging on the cellular network provided by base station 122. In order to communicate on the cellular network provided by these base towers, UAV 110 may utilize an antenna with a specialized dynamic shield component in antenna housing 112 to the antenna to selectively block RF signals from specific directions of incidence. For example, while within the ground level coverage area 124 of base station 122 at altitude (e.g., determined from the coverage area along a 2D coordinate system or the coverage volume in a 3D coordinate system), antenna housing 112 may adjust one or more shields to the RF signal antenna of UAV 110 to allow RF signals in coverage area 124 from base station 122, while absorbing or reflecting other RF signals. Positioning and orientation of the shields may be determined based on the location of UAV 110, coverage area 124, and/or ground objects 126*a-c* causing the ground level interference/loss. Thus, antenna housing 112 may adjust the shields to mimic the ground level interference/loss within coverage area 124 at altitude for the antenna of UAV 110.

Figure 3:
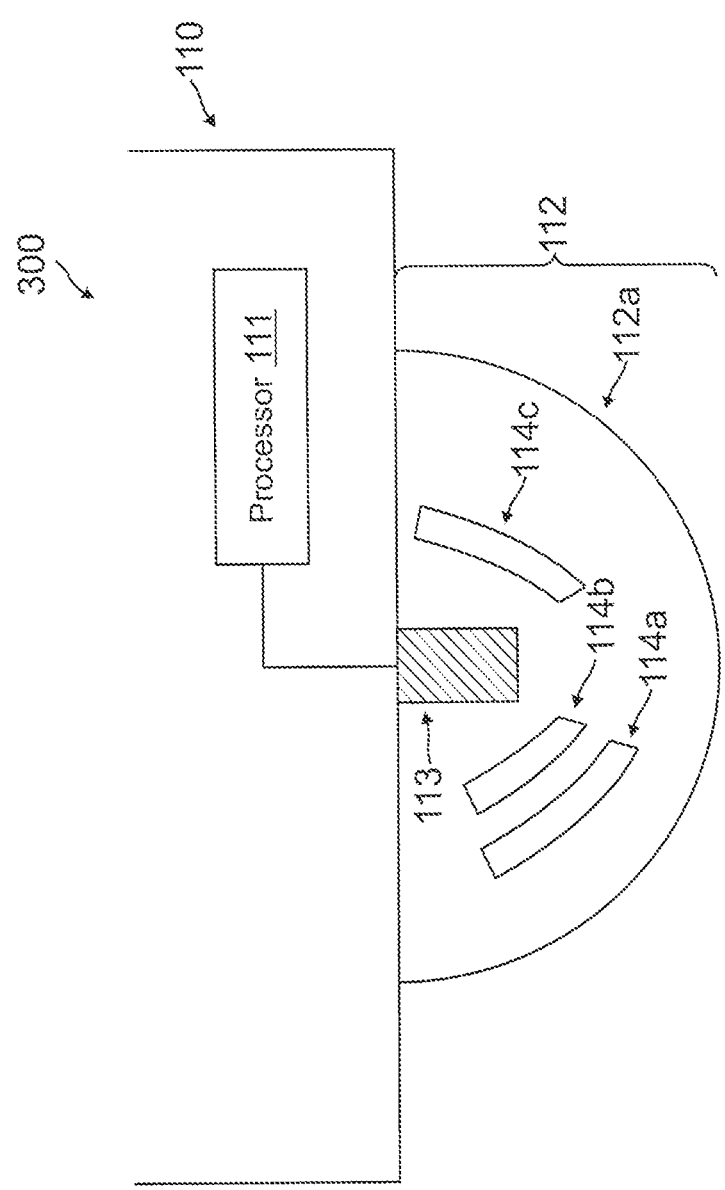
FIG. 3 illustrates a block diagram of an exemplary UAV having a dynamic shielding unit that imitates ground level interference and loss at altitude, according to an embodiment.

FIG. 3 illustrates a block diagram of an exemplary UAV having a dynamic shielding unit that imitates ground level interference and loss at altitude, according to an embodiment. System 300 includes unmanned aerial vehicle (UAV) 110 and antenna housing 112 discussed in reference to network environment 100 of FIG. 1. In this regard, UAV 110 and/or a controller of antenna housing 112 may control one or more moveable shields of antenna housing 112 to provide RF signal shielding (e.g., absorbing or reflecting) from RF signals from unwanted directions during flight of UAV 110 in order to mimic ground level RF communications of UEs while UAV 110 travels at altitude.

UAV 110 includes one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 160.

UAV 110 may be implemented as a UAV, UAS, drone, or other aerial vehicle that may utilize appropriate hardware and software configured for wired and/or wireless communication with cellular network carrier 120. Although only one UAV is shown, a plurality of UAVs may function similarly. UAV 110 of FIG. 1 contains a processor 111 and antenna housing 112. Processor 111 may utilize executable processes, procedures, and/or applications with associated hardware to operate UAV 110, such as a flight controller and/or navigation component or unit. Processor 111 may also be utilized to determine shielding orientations for antenna housing 112 and/or provide data required by a controller of antenna housing 112 for determination of the shielding orientations. In other embodiments, UAV 110 may include additional or different modules having specialized hardware and/or software as required.

Processor 111 may correspond to one or more processing units of UAV 110 to operate and navigate UAV 110, for example, to travel one or more flight paths in order to collect cellular network information. In this regard, processor 111 may be configured to facilitate navigation of UAV 110, e.g., take off, landing, and flight of UAV 110, which may include execution of the flight path(s) or route(s). Processor 111 may include any appropriate avionics, control actuators, and/or other equipment, along with associated logic, circuitry, interfaces, memory, and/or code. Additionally, processor 111 may include a controller that receives flight route information from one or more sources, including memory 115 and/or external controller (e.g., set instructions from cellular network carrier 120 and/or inflight navigation/instructions from an operator) that operates UAV 110. Thus, processor 111 may be fed flight controls, paths, and/or routes from one or more of memory 115 and/or communication component 114. Processor 111 may determine a location of UAV 110, which may be utilized with antenna housing 112 for shielding of one or more antennas. Additionally, processor 111 may be utilized to determine shielding requirements for antenna housing 112, or may provide information to another controller of antenna housing 112 for determination of the shielding requirements. The provided information may include the location of UAV 110, as well as ground based interference/loss information for ground based UEs or cellular network mapping, as appropriate. Processor 111 may also be utilized to communicate on a cellular network utilizing an antenna within antenna housing 112 (e.g., a 3G, 4G, 5G, and/or other 3GPP-based cellular network).

Antenna housing 112 may be utilized to detect cellular network information, for example, by receiving power (e.g., radio signals) from one or more base stations or other cellular network signal propagation source. Antenna housing 112 includes a housing shell 112*a*, an antenna 113, and shielding components 114*a-c*. Housing shell 112*a* may be contained within a housing of UAV 110 (e.g., embedded within the housing and/or circuitry of UAV 110), or disposed (e.g., mounted) outside a housing of UAV 110 as an attachable and/or removable module. Housing shell 112*a* may enclose the necessary components to provide a dynamic shield system of cellular signals for antenna 113 of UAV 110. Thus, housing shell 112*a* may include additional, less, and/or different components to those shown in system 300, including necessary mechanical components, motors, powers sources, etc., for the placement, orientations, and rearrangement of shielding components 114*a-c*.

Antenna 113 may sense the radio signals, and be used to record the radio signals along with associated information (e.g., position information) to memory 115 for storage and use. In some cases, the antenna housing 112 may be movable along and/or rotatable about one, two, or three axes. In other cases, the antenna housing 112 may be fixed (e.g., not movable and not rotatable). Antenna 113 may correspond to a cellular technology (e.g., using LTE or other cellular technology communication signal) antenna. Antenna 113 may be used to measure signal strength, signal diagnostics, and/or interferences of cellular tower signals for a cellular network. The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Additionally, antenna 113 may be used to message and/or communicate with one or more base stations.

Shielding components 114*a-c* may include wireless signal shielding materials and necessary mechanical components to be movable and/or rotatable around antenna 113. Shielding components 114*a-c* may block RF signals from a direction of incidence to antenna 113 by moving to interpose one or more of shielding components 114*a-c* between the direction of incidence and antenna 113. The material for shielding components 114*a-c* may absorb and/or reflect wireless signals incoming from the incident direction (e.g., when interposed between the direction of the incoming wireless signal and antenna 113). Thus, when one or more of shielding components 114*a-c* are placed between antenna and the incoming direction of the wireless signal, the one or more of shielding components 114*a-c* may prevent antenna 113 from detecting, absorbing and/or receiving the wireless signal, as well as transmitting wireless signals from antenna 113 to other receivers or transceivers in that direction. One or more of shielding components 114a-c may completely absorb or reflect the signal, or partially absorb or reflect the signal. Thus, more than one of shielding components 114a-c may be required in certain aspects to provide complete signal shielding from a direction. Shielding components 114a-c may block signals on the cellular network in the RF range used by the cellular network that are provided from base stations of the cellular network carrier within coverage areas of the RF signals from those base stations. In other embodiments, shielding components 114a-c may further or instead absorb or reflect wireless signals for other types of wireless networks, for example, to accommodate other types of wireless communication signals (e.g., satellite systems, short range wireless communication signals, etc.). However, in certain embodiments, the material used for shielding components 114a-c may be selected to only block RF signals on the cellular network to allow other types of wireless communications selectively used for the UAV (e.g., line of sight communications to control the UAV).

Figure 4:
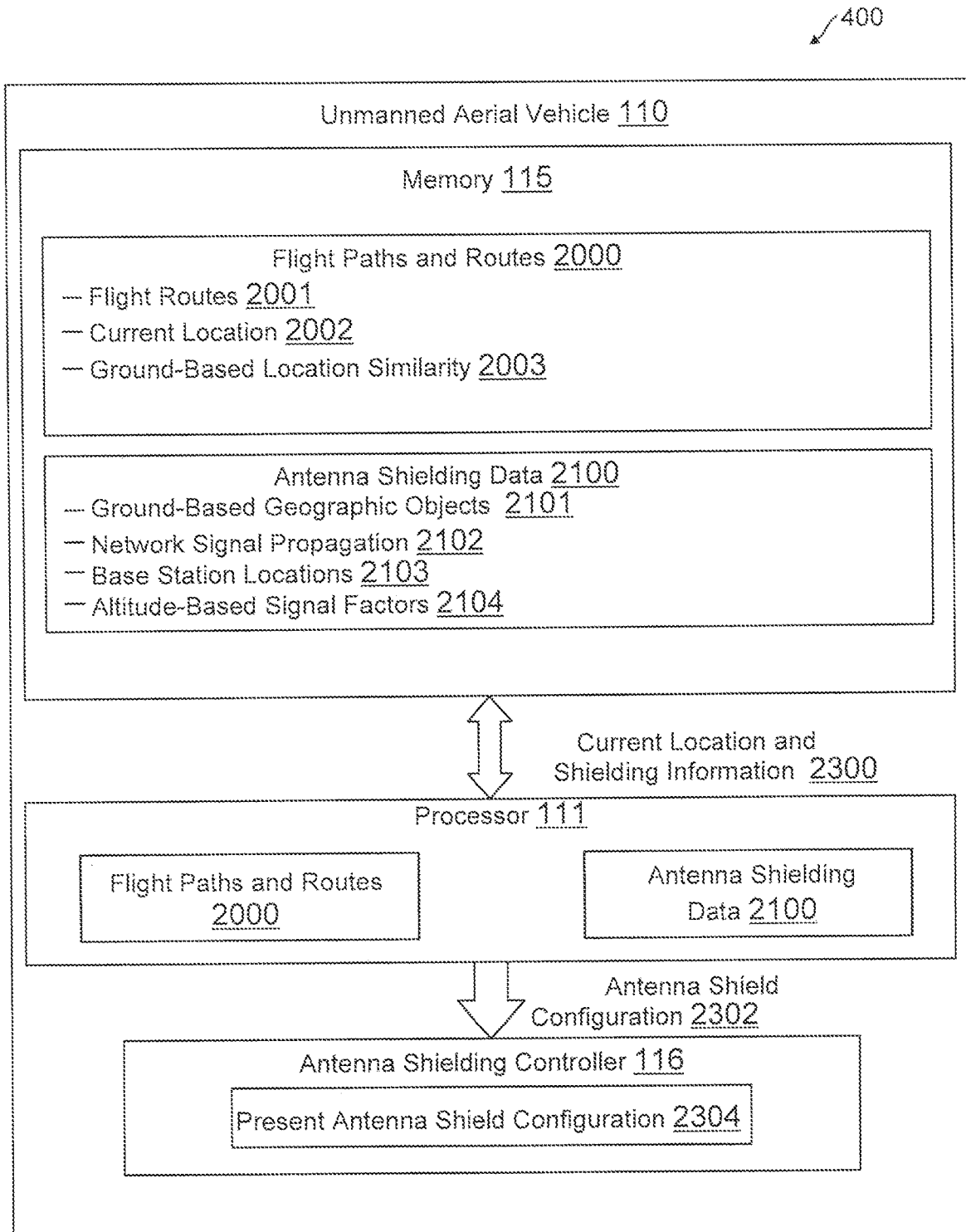
FIG. 4 illustrates a block diagram of an exemplary UAV controlling a dynamic shield system of cellular signals for an antenna of the UAV, according to an embodiment.

FIG. 4 illustrates a block diagram of an exemplary UAV controlling a dynamic shield system of cellular signals for an antenna of the UAV, according to an embodiment. Not all of the depicted components may be required, however, and one or more embodiments may include additional components shown in the additional Figures described herein. Variations in the arrangement and type of the components may be made without departing from the spirit or scope of the claims as set forth herein. Additional components, different components, and/or fewer components may be provided. For explanatory purposes, processor 111 and an antenna shielding controller 116 of UAV 110 is described herein with reference to network environment 100 of FIG. 1 and system 300 of FIG. 3; however, antenna shielding controller 116 is not limited to network environment 100 of FIG. 1 and/or and system 300 of FIG. 3.

UAV 110 may include processor 111, a memory 115, and antenna shielding controller 116. Processor 111 may implement any control and feedback operations appropriate for interacting with the avionics, control actuators, and/or other equipment included in the flight control unit to fly UAV 110, including, but not limited to, taking off, landing, and/or setting/adjusting direction, velocity, and/or acceleration of UAV 110. In some cases, processor 111 may receive commands from user devices, base stations, and/or a cellular network carrier to, for example, configure and execute a flight plan (e.g., program a flight path), adjust a programmed flight path, deploy UAV 110, land UAV 110, navigate UAV 110, and/or other commands that facilitate navigating UAV 110 and utilizing UAV 110 to perform an action. In some cases, processor 111 may receive commands to move and/or rotate UAV 110 and/or a component thereof (e.g., an antenna). Processor 111 may further be utilized to control placement, movement, and/or orientation of one or more shielding components of antenna for UAV 110 using antenna shielding controller 116, for example, by providing information to antenna shielding controller 116 for placement/orientation of the shielding components to selectively block RF signals in order to mimic ground level interference/loss while UAV 110 travels at altitude.

Memory 115 may include flight paths and routes 2000 that may be output to memory 115 from processor 111 at step 2300 during transfer of current location and shielding information between memory 115 and processor 111. Flight paths and routes 2000 may include information for flight routes 2001 and a current location 2002 during operation of UAV 110. Additionally, flight paths and routes 2000 includes ground-based location similarity 2003, which may be determined based on current location 2002 in order for processor 111 and/or antenna shielding controller 116 to determine a shield configuration to mimic ground level interference/loss. Thus, processor 111 may further be utilized to monitor (e.g., autonomously monitor) a current position of UAV 110. Processor 111 may include, or may be in communication with, a GPS that provides the position of UAV 110. In some cases, processor 111 may implement location determination techniques. For example, processor 111 may determine a positional difference between UAV 110 and a base station based on the position information of UAV 110 and the base station. Processor 111 may then execute flight paths and routes accordingly to navigate UAV 110.

Based on ground-based location similarity in data for flight paths and routes 2000, processor 111 may further retrieve antenna shielding data 2100. Antenna shielding data 2100 includes ground-based geographic objects 2101, network signal propagation 2102, base station locations 2103, and altitude-based signal factors 2104, each of which may be utilized to determine shielding orientation and/or placement of one or more RF signal shields for an antenna of UAV 110. Processor 111 may determine an antenna shield configuration, and output the antenna shield configuration to antenna shielding controller 116. Thus, antenna shielding controller 116 may utilize present antenna shield configuration 2304 to move, orient, or place one or more RF shields surrounding an antenna in order to receive select RF signals as would a UE at ground-based location similarity 2003. In other embodiments, data for flight paths and routes 2000 and antenna shielding data 2100 may instead be transmitted to antenna shielding controller 116.

While an example manner of implementing UAV 110 is illustrated in FIG. 4, one or more of the components (e.g., elements, processes, and/or devices) illustrated in FIG. 4 may be combined, divided, re-arranged, omitted, eliminated, and/or implemented in any other way. Further, the components of UAV 110 in FIG. 4 may be implemented by hardware, software, firmware, and/or any combination of hardware, software, and/or firmware. Thus, for example, any of the components of UAV 110 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the components of UAV 110 may be referred to as UAV processing circuit, communication transceiver circuit, mobility controller circuit, and autonomous positioner circuit, respectively. When reading any claims as set forth herein to cover purely software and/or firmware implementations, at least one of the components of UAV 110 is hereby expressly defined to include a tangible computer readable storage device or storage disk such as a memory, digital versatile disk (DVD), compact disk (CD), a Blu-ray Disc™, and/or other storage device/disk storing the software and/or firmware.

Figure 5:
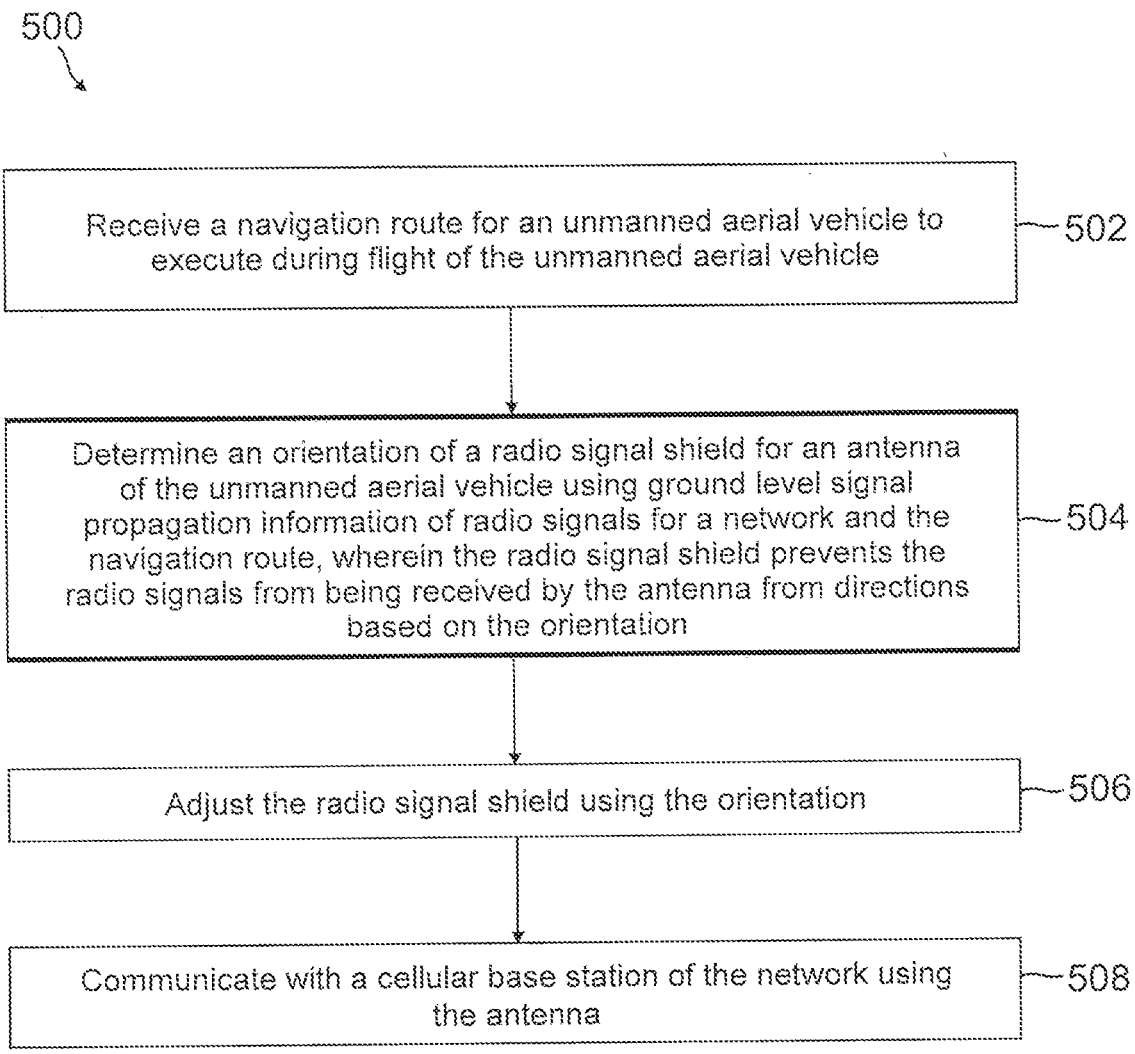
FIG. 5 illustrates a flow diagram for a dynamic shield system of cellular signals for an antenna of a UAV, according to an embodiment.

FIG. 5 illustrates a flow diagram for a dynamic shield system of cellular signals for an antenna of a UAV, according to an embodiment. Note that one or more steps, processes, and methods described herein in flowchart 500 may be omitted, performed in a different sequence, or combined as desired or appropriate.

At step 502, a navigation route for an unmanned aerial vehicle to execute during flight of the unmanned aerial vehicle is received.

At step 504, an orientation of a radio signal shield for an antenna of the unmanned aerial vehicle is determined using ground level signal propagation information of radio signals for a network and the navigation route, wherein the radio signal shield prevents or attenuates the radio signals from being received by the antenna from directions based on the orientation. The radio signal shield may include one or more components or materials that prevent or attenuate reception of radio frequency signals by the antenna from an opposite direction of travel of the unmanned aerial vehicle on the travel route, wherein the component(s) rotates to prevent or attenuate the reception of the radio frequency signals by the antenna from directions that the antenna does not require the radio frequency signals. In order to prevent or attenuate radio frequency signals, the component(s) may comprise at least one of a radio frequency absorbing material or a radio frequency reflecting material of radio frequency signals. The orientation of the component(s) may be dependent on travel route direction of travel of the unmanned aerial vehicle along a flight path, such as the navigation route, as well as an altitude of the UAV. Additionally, a number of component(s) used to shield the antenna may be dependent on the altitude of the unmanned aerial vehicle during operation. Where there are multiple components, the orientation may comprise an arrangement of the plurality of components around the antenna.

The ground level signal propagation information or other antenna shielding data may specific for a geographic region of travel by the unmanned aerial vehicle, wherein the unmanned aerial vehicle operates by flying a route within the geographic region. The information or other data may be determined using radio signal coverage areas at a ground level for base stations of a cellular network carrier providing the network. Additionally, the information or other data may comprise placement information for the component(s) used to send and receive the radio signals with a selected base station of the base stations using the antenna, wherein the selected base station is further selected by a similar user endpoint at the ground level corresponding to a current position of the unmanned aerial vehicle during operation. Thus, the placement information for the component(s) may mimic geographic conditions at the ground level for the antenna.

Figure 6:
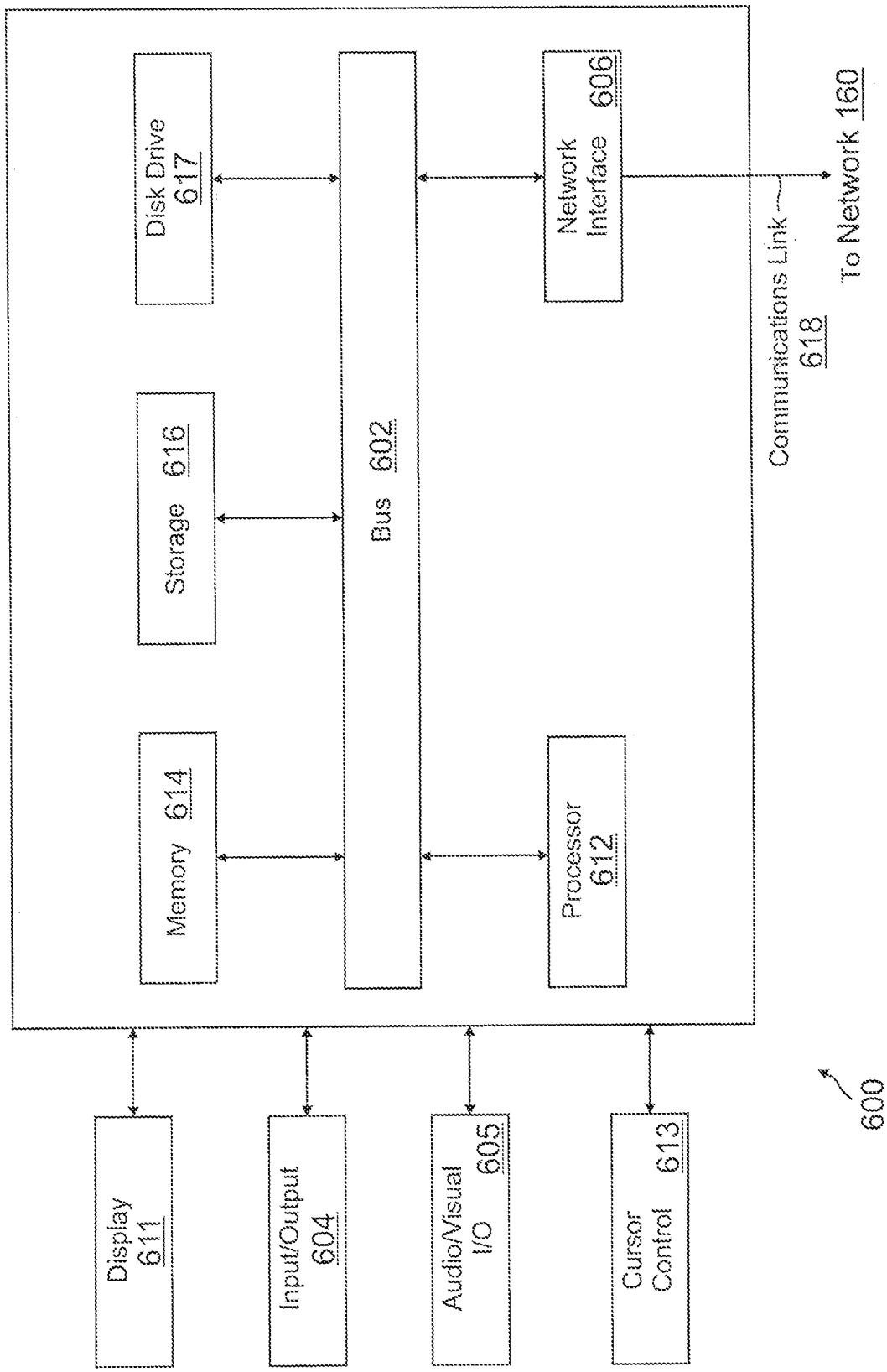
FIG. 6 illustrates a block diagram of an example of an electronic system with which one or more embodiments of the present disclosure may be implemented, according to an embodiment.

At step 506, the radio signal shield is adjusted using the orientation. And at step 508, the unmanned aerial vehicle communicates with a cellular base station of the network using the antenna. Communicating on the network comprises sending and receiving the radio signals by the antenna with a base station selected based on the placement or orientation of the component(s). The network may comprise one of a 3G, a 4G, a 4G Long Term Evolution (LTE), or a 5G network for communication with user endpoints including the unmanned aerial vehicle. In various embodiments, during further operation of the unmanned aerial vehicle, a change in a route travelled by the unmanned aerial vehicle is received. Thus, a second placement or orientation is determined of the component(s) using the signal propagation and/or antenna shielding data and the change in the route, and the components are arranged or moved based on the second placement or orientation before further communications or during those communications on the network FIG. 6 illustrates a block diagram of an example of an electronic system with which one or more embodiments of the present disclosure may be implemented, according to an embodiment. In various embodiments, computer system 600 of FIG. 6 may comprise a personal computing device (e.g., smart phone, a computing tablet, a personal computer, laptop, a wearable computing device such as glasses or a watch, Bluetooth device, key FOB, badge, etc.) capable of communicating with the network. In other embodiments, a cellular network carrier or provider may utilize a network computing device (e.g., a network server) capable of communicating with the network similar to computer system 600. Moreover, one or more of the systems of a UAV may include and/or function similarly to computer system 600. It should be appreciated that each of the devices utilized by users and/or service providers (e.g., cellular network carriers) may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 160. Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components described herein. In various embodiments, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In various embodiments, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
obtaining, by a system comprising a processor, a flight path of an unmanned aerial vehicle; and
configuring, by the system, a placement of an antenna shield with respect to an antenna of the unmanned aerial vehicle during flight along the flight path to mimic a signal characteristic at ground level for communication between the unmanned aerial vehicle and a base station at the ground level.

2. The method of claim 1, wherein the flight path comprises a lowest altitude and a highest altitude of the unmanned aerial vehicle in the flight path, and the configuring the placement of the antenna shield is based on the lowest altitude and the highest altitude of the unmanned aerial vehicle in the flight path.

3. The method of claim 1, wherein the configuring the placement of the antenna shield comprises modifying the placement of the antenna shield responsive to condition changes during the flight to maintain the mimic of the signal characteristic.

4. The method of claim 1, wherein the signal characteristic is a signal interference characteristic.

5. The method of claim 1, wherein the signal characteristic is a signal loss characteristic.

6. The method of claim 1, wherein the configuring the placement of the antenna shield is based on a weather condition in the flight path.

7. The method of claim 1, wherein the configuring the placement of the antenna shield comprises obtaining information regarding changes in the signal characteristic along the flight path.

8. A system, comprising:
a processor; and
a memory that stores executable instructions that, when executed by the processor, facilitate performance of operations, the operations comprising:
determining a flight path of a drone; and
modifying an orientation of an adjustable barrier with respect to an antenna of the drone during flight along the flight path to imitate a signal characteristic at ground level for communication between the drone and an access point at the ground level.

9. The system of claim 8, wherein the flight path comprises a lower limit altitude and a higher limit altitude of the drone in the flight path, and the modifying the orientation of the adjustable barrier is based on the lower limit altitude and the higher limit altitude of the drone in the flight path.

10. The system of claim 8, wherein the modifying the orientation of the adjustable barrier comprises continuously adjusting the orientation of the adjustable barrier during the flight to maintain imitation of the signal characteristic.

11. The system of claim 8, wherein the signal characteristic is signal interference.

12. The system of claim 8, wherein the signal characteristic is signal loss.

13. The system of claim 8, wherein the modifying the orientation of the adjustable barrier is based on an obstacle in a defined area of the flight path.

14. The system of claim 8, wherein the modifying the orientation of the adjustable barrier comprises obtaining information regarding changes in the signal characteristic along the flight path.

15. A non-transitory machine-readable medium, comprising executable instructions that, when executed by a processor of an aerial vehicle, facilitate performance of operations, the operations comprising:
analyzing a flight path of the aerial vehicle; and
based on the analyzing, adjusting a configuration of an adjustable shield with respect to an antenna of the aerial vehicle during flight along the flight path to conform to a signal characteristic at ground level for communication between the aerial vehicle and a network access point at the ground level.

16. The non-transitory machine-readable medium of claim 15, wherein the flight path comprises a lower limit on altitude and an upper limit on altitude of the aerial vehicle in the flight path, and the adjusting the configuration of the adjustable shield is based on the lower limit on altitude and the upper limit on altitude of the aerial vehicle in the flight path.

17. The non-transitory machine-readable medium of claim 15, wherein the adjusting the configuration of the adjustable shield comprises periodically adjusting the configuration of the adjustable shield during the flight to maintain conformance to the signal characteristic.

18. The non-transitory machine-readable medium of claim 15, wherein the signal characteristic is signal interference.

19. The non-transitory machine-readable medium of claim 15, wherein the signal characteristic is signal loss.

20. The non-transitory machine-readable medium of claim 15, wherein the adjusting the configuration of the adjustable shield is based on an environmental condition in the flight path.

\* \* \* \* \*